D. BENJAMIN.
CONDENSING RADIATOR.
APPLICATION FILED APR. 28, 1917.
1,335,812.
Patented Apr. 6, 1920.
3 SHEETS—SHEET 2.
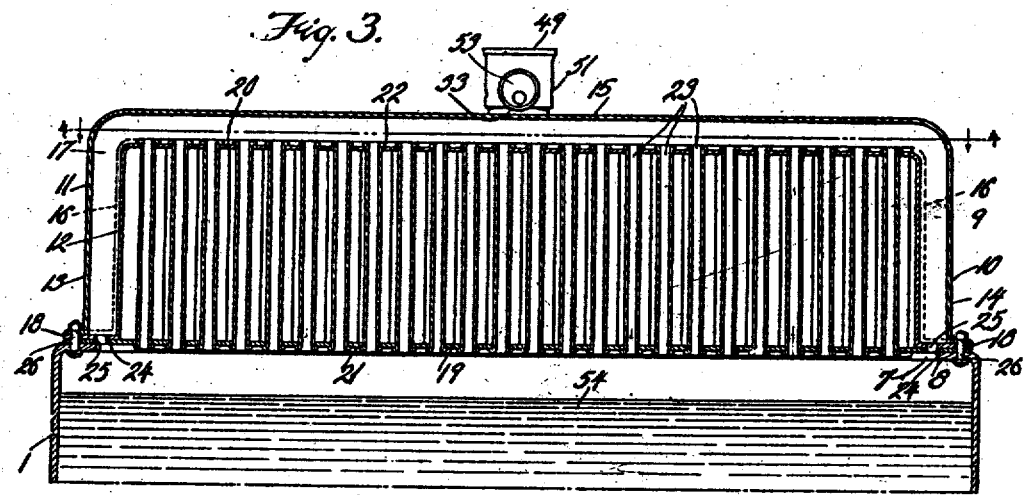
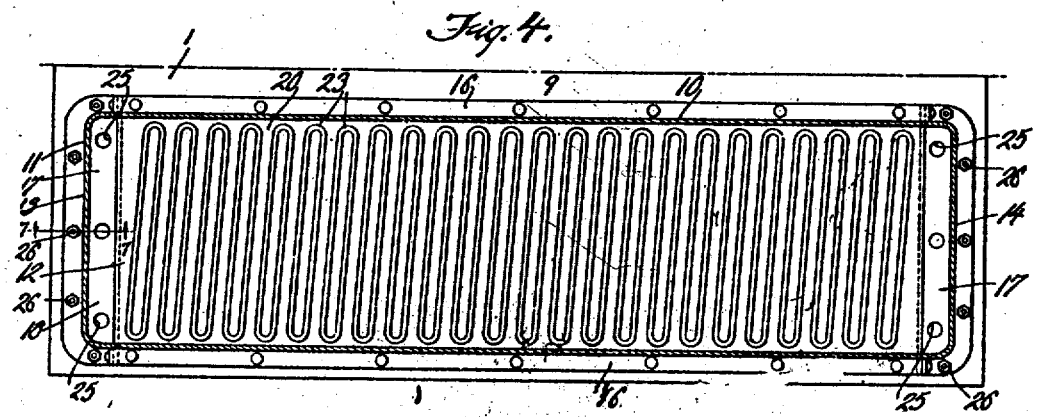
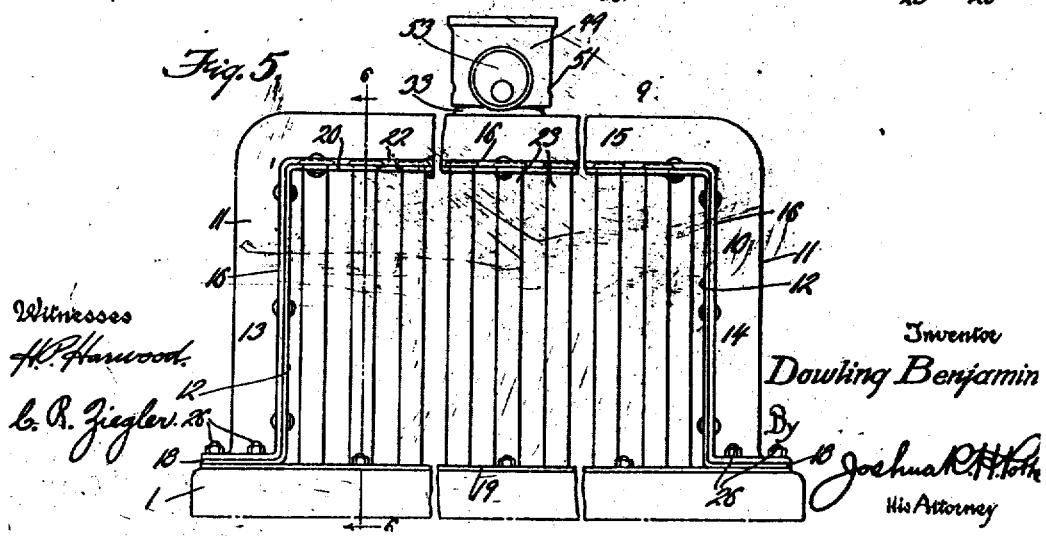
Witnesses
H. P. Harwood.
C. R. Ziegler.
Inventor
Dowling Benjamin
By Joshua R. H. Toth
His Attorney D. BENJAMIN.
CONDENSING RADIATOR.
APPLICATION FILED APR. 28, 1917.
1,335,812.
Patented Apr. 6, 1920.
3 SHEETS—SHEET 3.
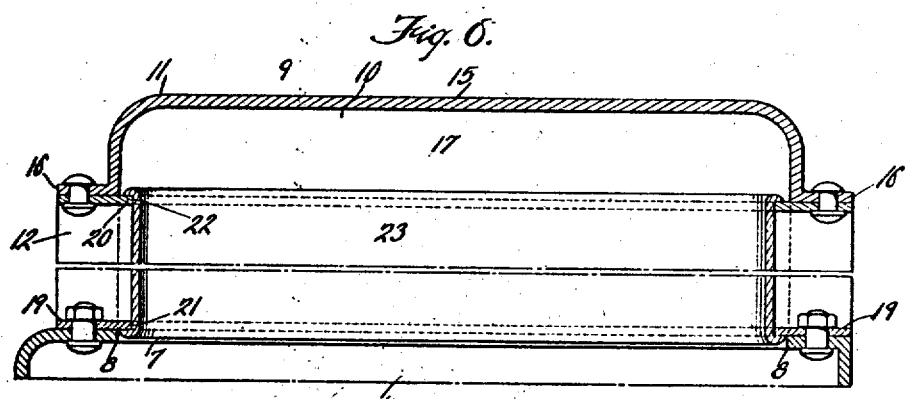
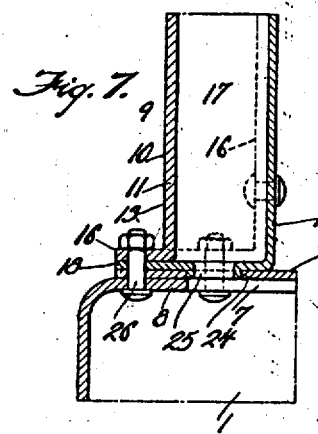
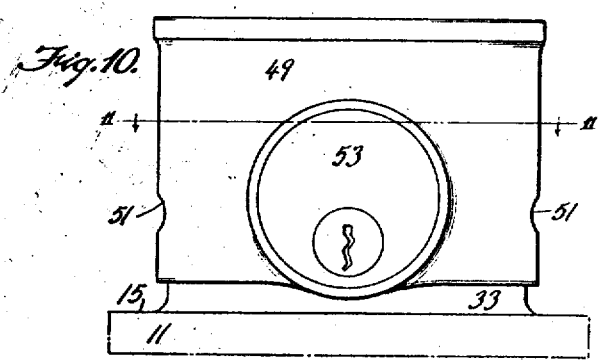
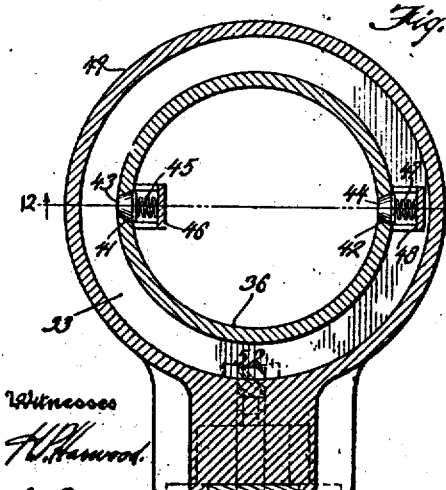
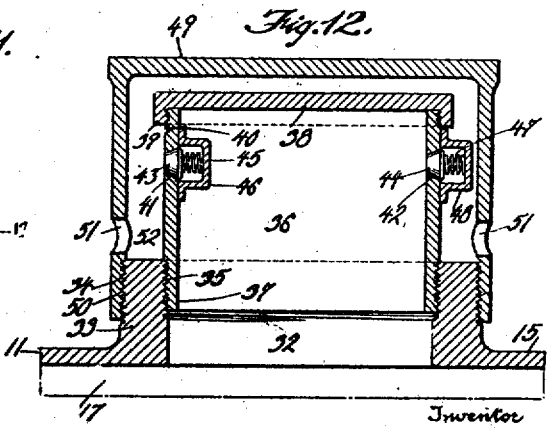
Inventor
Dowling Benjamin.
By
Joshua R. H. Potts
His Attorney

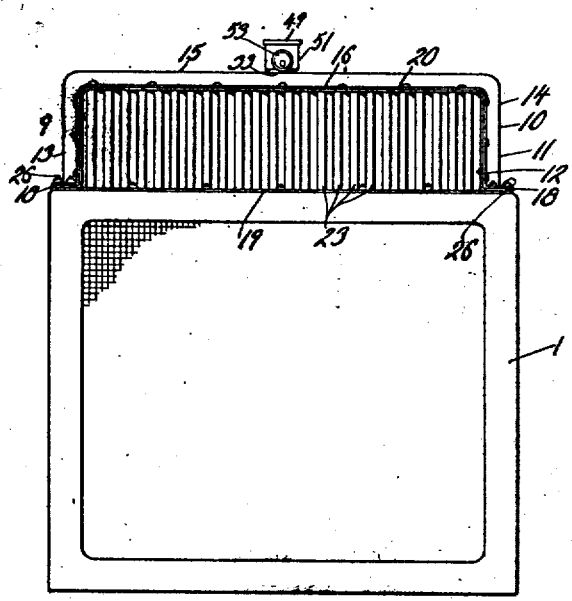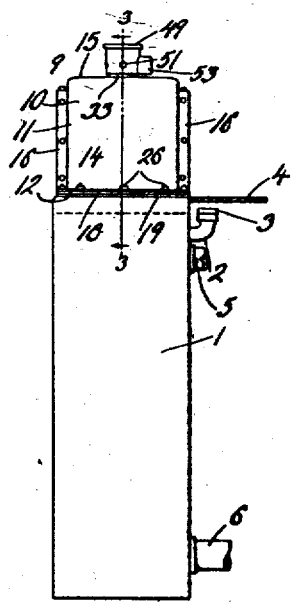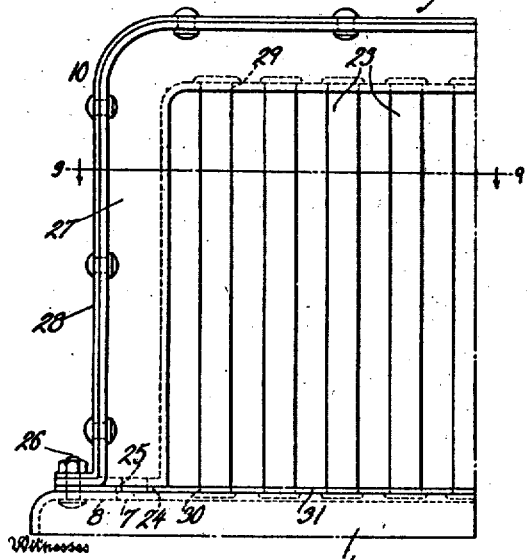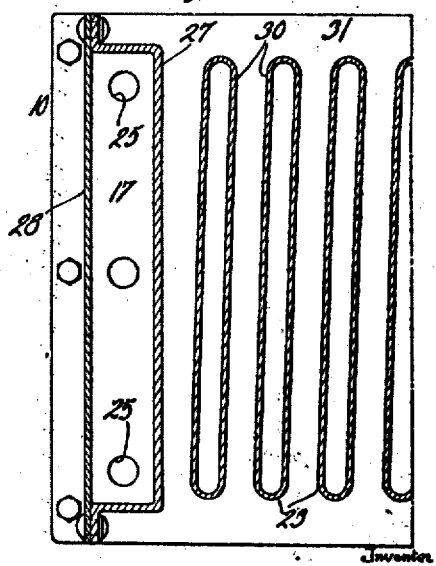

UNITED STATES PATENT OFFICE.

DOWLING BENJAMIN, OF CAMDEN, NEW JERSEY.

CONDENSING-RADIATOR.

1,335,812.　　　Specification of Letters Patent.　　Patented Apr. 6, 1920.

Application filed April 28, 1917. Serial No. 165,050.

*To all whom it may concern:*

Be it known that I, DOWLING BENJAMIN, a citizen of the United States, residing at Camden, in the county of Camden and State of New Jersey, have invented certain new and useful Improvements in Condensing-Radiators, of which the following is a specification.

Automobile radiators are usually constructed solely for the purpose of cooling the water, or other fluid which is used in all water cooled automobile engines, the idea being to practically keep the radiator filled with water. To secure the complete filling of the radiator and also to keep the radiator chamber freely open to the atmosphere, there is necessarily provided an overflow pipe which extends entirely to the top of the radiator, the object being to keep the radiator full of water or mixture of water and anti-freeze liquid. This desired ideal condition in all such radiators, however, is not attained or maintained when the automobile is in use, for the reason that there is a constant loss of the fluid through the overflow pipe by evaporation, expansion of fluid by heat, and splash and spill of the fluid through the overflow pipe due to the motion of the car caused by irregularities of the road and vibration. The result of these conditions, therefore, inevitably causes in a short time the formation of a vacant space at the top of the radiator which increases in size as time goes on until the radiator, if not constantly refilled, becomes absolutely empty causing injury to the engine. This latter condition occurs very quickly if the temperature of the fluid reaches the boiling point.

The main object of my invention is to overcome and obviate the above mentioned faults, difficulties, and disadvantages by producing a condensing radiator which has no open overflow pipe or outlet and which is normally closed to the atmosphere.

Another object is to provide my invention with a condensing head which is capable of condensing steam or other vapor and returning the liquid of condensation back into the radiator as fast as the liquid is evaporated.

Another object is to construct my invention so that it will normally be operative while closed to the atmosphere.

A further object is to provide my invention with means for regulating the internal pressure proportionately to the atmospheric pressure.

A still further object is to provide my invention with a condensing head which is so located and constructed that the vapor entering the same will be automatically kept moving into contact therewith due to the splash of the cooling fluid and variation of the level of the cooling fluid in the radiator, said variation being caused by the motion of the automobile.

Another object of my invention is to provide means which will effectively carry off the heat of the water or other cooling fluid which is used to keep the engine cylinders cool.

A still further object is to so design my invention that it will be of comparatively simple construction and can be readily attached or removed.

A still further object is to so design my invention that it will be of simple construction and can be readily attached to or removed from automobiles of various types.

These objects, and other advantageous ends which will be described hereinafter, I attain in the following manner, reference being had to the accompanying drawings in which—

Figure 1 is a front elevation of a combined vapor condenser and radiator constructed in accordance with my invention.

Fig. 2 is a side view of Fig. 1 showing in section a part of the hood of the automobile.

Fig. 3 is an enlarged section taken on the line 3—3 of Fig. 2.

Fig. 4 is a sectional plan view taken on the line 4—4 of Fig. 3.

Fig. 5 is a fragmentary front elevation of my invention on a larger scale than shown in Fig. 1.

Fig. 6 is an enlarged transverse section on the line 6—6 of Fig. 5.

Fig. 7 is an enlarged fragmentary section on the line 7—7 of Fig. 4.

Fig. 8 is a fragmentary elevation of my invention showing a modification of the construction.

Fig. 9 is a section on the line 9—9 of Fig. 8.

Fig. 10 is an elevation of a pressure compensating device forming a part of my invention.

Fig. 11 is a section on the line 11—11 of Fig. 10, and

Fig. 12 is a sectional elevation taken on the line 12—12 of Fig. 11.

Referring to the drawings, 1 represents the tank through which circulates the cooling fluid for the engine cylinders. This tank in the present instance has a filling inlet illustrated in the form of a pipe 2 which is closed with a cap 3 and located under the usual hood 4.

Pipes 5 and 6 connect with a receptacle in the form of a tank 1 and form the circulating means between the tank and the usual water jacket of the engine, the latter not being illustrated in the drawing.

The tank 1 is open at the top as shown at 7 and has an inturned flange 8 which forms a ledge or seat for a vapor-condensing head 9. It will be noted that the filling pipe 2 enters the tank 1 at a point below the vapor-condensing head 9 so that it is impossible to overfill said tank. Thus the vapor-condensing head 9 is kept free of the cooling-fluid when the automobile is not in motion but is permitted to splash therein, as will be explained hereinafter, when the automobile is in motion. In Figs. 1 to 7 inclusive, this head includes a hollow jacket 10 which comprises two sections 11 and 12. The section 11 consists of a recessed casting having two substantially vertical extensions 13 and 14 and a horizontal portion 15. The section 11 has integral flanges 16 both front and back, and these flanges at the inner edges and bottoms of the vertical extensions 13 and 14 and at the bottom edges of the portion 15 form means for the attachment of the section 12 which in the present instance consists of a plate of sheet metal bent in the form illustrated.

The flanges 16 of the section 11 may be secured to the section 12 by rivets as illustrated or by any other suitable means such for example as electric or spot welding. The section 12 is preferably made of a plate of sheet metal and extends from front to back and thus the recess in the section 11 forms a chamber 17 which extends throughout the length of the extensions 13 and 14 and the horizontal portion 15. The section 12 at its extreme bottom is bent under the extensions 13 and 14 as illustrated at 18 (see Fig. 7), and rivets or bolts 26 extend through the bottom flanges of the extensions 13 and 14.

A base plate 19 extends directly under the jacket 10 and under the portions 18 of the section 12, and this plate 19 and the horizontal portion 20 of the section 12 have slots 21 and 22 respectively arranged in vertical alinement.

A plurality of hollow plates 23 which are preferably made of flattened tubes, extend between the plate 19 and portion 20 of the section 12, the opposite ends of said hollow plates extending respectively through the slots 21 and 22. These ends of the hollow plates 23 are beaded or flanged so as to form a seal between the slots and the tubes and also to secure the hollow plates in position.

The ends of said hollow plates are open so as to establish communication between the interior of the tank 1 and the chamber 17. The slots 21 and 22 are arranged at an angle so that the hollow plates 23 when secured in position, will also be disposed at an angle as clearly shown in Fig. 4 for a purpose hereinafter described.

The base plate 19, adjacent its opposite end, is provided with holes 24 through which extend sleeves 25 which may be formed by punching the portions 18 of the section 12 downwardly as clearly shown in Fig. 7, said sleeves also forming perforations or holes within said portion 18, so that the portion of the chamber 17 which extends within the extensions 13 and 14 is also in communication with the interior of the tank 1.

The base plate 19 also rests on the flange 8 of the tank 1. The bolts or rivets 26 pass through the flanges 16 of the section 11, the portion 18 of the section 12, the base plate 19, and the flange 8 of the tank 1, thus securing the head 9 to the tank 1 and permitting said head to be readily removed from the tank and also permitting the section 11 to be removed from the section 12.

In Figs. 8 and 9, I have illustrated practically the same construction with the exception that instead of locating the recessed casting of the hollow jacket on the extreme outside of the head as illustrated in connection with Figs. 1 to 7 inclusive, I provide a recessed casting 27 and a section 28 of sheet material is secured to the outer flanged portion of said section 27.

In this instance the hollow plates extend directly through slots 29 in the section 27 and through the slots 30 in a base plate 31, the latter corresponding to the base plate 19 above described. In all other respects the construction is similar to that described in connection with Figs. 1 to 7 inclusive and I have therefore given similar parts corresponding reference numerals.

In Figs. 10 to 12 inclusive, I have illustrated the pressure compensating portion of my invention, the description of the same being as follows:—

The horizontal portion 15 of the section 11 has an opening 32 and extending directly from this opening is an annular flange 33 which is externally screw-threaded at 34 and internally screw-threaded at 35.

A sleeve 36 has its lower end 37 screw-threaded and designed to fit within the internally screw-threaded portion 35 of the annular flange 33. A cover plate 38 has a depending flange 39 which is internally screw-threaded and designed to engage the upper screw-threaded end 40 of the sleeve 36. The sleeve 36 is provided with tapered openings 41 and 42, the opening 41 tapering outwardly while the opening 42 tapers inwardly. These two openings respectively form seats for two frusto-conical valves 43 and 44.

The valve 43 is designed to be pressed against its seat by a coiled spring 45 which is backed by a bridge 46 secured to the inner surface of the sleeve 36. The valve 44 is held upon its seat by a spring 47 which in turn is backed by a bridge 48 secured to the outer surface of the sleeve 36.

A cap 49 has an internally screw-threaded bottom edge portion 50 which fits the externally screw-threaded portion 34 of the annular flange 33. This cap 49 is of larger diameter than the sleeve 36 and forms a housing therefor.

The cap 49 is perforated at 51 and these perforations communicate with the space 52 located between the inner surface of the cap 49 and the outer surface of the sleeve 36. It will thus be understood that any pressure that is formed within the chamber 17 will be compensated for by the valves 43 and 44. For example, if the pressure within the chamber 17 becomes greater than the resisting power of the spring 47, the valve 42 will be forced outwardly to relieve the pressure, and the valve 44 will remain open until the pressure within the chamber 17 and consequently within the tank 1 is reduced. On the other hand, if the pressure within the chamber 17 is greatly reduced, the valve 43 will be opened by pressure outside of sleeve 36 and thereby compensate for the difference between the external and internal pressure.

To guard against the malicious removal of the cap 49, I provide the latter with a lock 53 which may be of any of the well known types such for example as Yale or Corbin, so that no one but an authorized person can remove the cap 49.

In the use of my invention, the movement of the automobile during its progress will cause the water or cooling fluid 54 within the tank 1 to frequently splash upwardly through the hollow plates 23, causing constant circulation of the vapor through the plates, and since the latter are spaced apart and have their outer surfaces exposed to the atmosphere, said vapor is condensed and runs back into the tank 1 and splash water 54 will also be cooled and will fall back into the tank 1.

If the extent of the splash on very rough roads is sufficient to pass entirely through the hollow plates 23, the water will run across the top surface of the section 12 and will then fall downwardly through the hollow plates 23 and also through the extensions 13 where it can return through the sleeves 25 to the tank 1, same as the condensed vapor.

By slanting the hollow plates 23 as above described and clearly illustrated in Fig. 4, a great amount of air will be caused to impinge against the outer surfaces of said plates, thereby causing the latter to be kept extremely cool when the automobile is in motion. Any vapor which is formed within the tank 1, will rise through the hollow plates and by coming into contact therewith and with the inner surface of the jacket 10, will be moved by the splash of the cooling-fluid and by the movement of the automobile and thus will be quickly condensed into liquid form and return to the tank 1.

It will thus be understood that with the employment of my invention on an automobile, the cooling fluid for the engines can be kept effectively cool and the vapor will be quickly condensed, thereby preventing loss of the cooling fluid since there is no overflow pipe necessary and the radiator is practically closed, thus avoiding evaporation or the spilling of the cooling fluid. Also by the construction and arrangement of the parts of my invention the vapor will be agitated and circulated through the condensing head, as above described, and the cooling fluid will be kept in motion. Thus the possibility of scaling of the several parts is reduced to a minimum.

By having the construction above set forth, I am enabled automatically and constantly to supply the radiator with the proper amount of distilled water. The advantage thereby attained is that there is no possibility of incrustation or chemical action upon the interior of the water cooling system for the reason that there is no concentration of mineral contents of the water by evaporation and for the reason that there is no necessity for adding water as is necessary in the radiators made prior to my invention. This is an important advantage since it is well known that all natural waters except distilled water contain mineral constituents which minerals, if the water is allowed to evaporate, form crystals on the interior of the radiator, thereby injuring the same so as to impair the proper functioning of the parts.

Also by my present invention I am enabled, when anti-freeze solutions are used which are composed of chlorids and other chemicals, to prevent the concentration of these solutions by loss of the water which holds them in solution. I thus preserve the uniform normal specific gravity or strength of the anti-freeze solution employed, thereby preventing concentration and chemical action as above noted. Furthermore, by the use of my invention, I am enabled when a mixture of alcohol and water is used for an anti-freeze solution to preserve the percentage of water and alcohol in their proper proportions one to the other. Owing to the fact that alcohol evaporates faster than water, it is obvious that without this construction the percentage of alcohol and water would rapidly change until the contents of a radiator would almost be deprived of its properties or its ability to act as an anti-freeze mixture.

By my improved condensing radiator, a still more important advantage is attained in releasing the vehicle upon which this radiator is placed from the necessity of an outside supply of liquid, thus enormously increasing the radius of operation of the vehicle and obviating the necessity of carrying extra water or other cooling liquid.

Furthermore, by providing the conpensating device, the desired pressure may be maintained within the tank 1, the perforations 51 permitting communication with the atmosphere when either of the valves 43 and 44 are opened.

While I have described the element 1 as a tank, it will be understood that any form of a receptacle may be used in lieu thereof, it being sufficient to state that any form of receptacle may be used as a support for or above which the head 9 is mounted.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A device of the character described including a receptacle for containing a cooling-fluid, a vapor-condensing head mounted above the normal level of the water in the receptacle, said head including a hollow jacket providing a chamber, a base plate located between the jacket and the receptacle, and hollow plates connecting the jacket and the base plate, said hollow plates having their passages communicating respectively with said chamber and the interior of the receptacle whereby the splash of the fluid within the receptacle will enter the passages of said plates and agitate the vapor therein and thereby accelerate its condensation, substantially as described.

2. A device of the character described including a receptacle for containing a cooling-fluid, a vapor-condensing head mounted above the normal level of the water in the receptacle, said head including a hollow jacket providing a chamber, a base plate located between the jacket and the receptacle and hollow plates connecting the jacket and the base plate, said hollow plates having their passages communicating respectively with said chamber and the interior of the receptacle whereby the splash of the fluid within the receptacle will enter the passages of said plates and agitate the vapor therein and thereby accelerate its condensation, the space between said jacket and the base plate being open to the atmosphere, substantially as described.

3. A device of the character described including a receptacle for containing a cooling-fluid, a vapor-condensing head mounted above the normal level of the water in the receptacle, said head including a hollow jacket providing a chamber, a base plate located between the jacket and the receptacle, and hollow plates connecting the jacket and the base plates, said hollow plates having their passages communicating respectively with said chamber and the interior of the receptacle whereby the splash of the fluid within the receptacle will enter the passages of said plates and agitate the vapor therein and thereby accelerate its condensation, said jacket having hollow downwardly projecting extensions forming a continuation of said chamber, substantially as described.

4. A device of the character described including a receptacle for containing a cooling-fluid, a vapor-condensing head mounted above the normal level of the water in the receptacle, said head including a hollow jacket providing a chamber, a base plate located between the jacket and the receptacle, and hollow plates connecting the jacket and the base plate, said hollow plates having their passages communicating respectively with said chamber and the interior of the receptacle whereby the splash of the fluid within the receptacle will enter the passages of said plates and agitate the vapor therein and thereby accelerate its condensation, said jacket having hollow downwardly projecting extensions forming a continuation of said chamber, said extensions, at their bottoms, being provided with holes forming communication between the interior of said extensions and the interior of the receptacle, substantially as described.

5. A combined vapor-condenser and radiator, including a receptacle, a vapor-condensing head mounted above the receptacle and including a hollow jacket providing a chamber, a base plate located between the jacket and the receptacle, and hollow plates connecting the jacket and the base plate, said hollow plates communicating respectively with said chamber and the interior of said receptacle, said jacket having downwardly projecting hollow extensions forming a continuation of said chamber toward said receptacle, said extensions at their bottoms being provided with holes forming communication between the interior of said extensions and the interior of the receptacle, said base plate having holes therein, the bottom portions of said extensions having sleeves which fit within the holes of said base plate, said sleeves providing said first holes, substantially as described.

In testimony whereof I have signed my name to this specification in the presence of two subscribing witnesses.

DOWLING BENJAMIN.

Witnesses:
MARY A. INGLAR,
CHAS. E. POTTS.